(12) United States Patent
Assalve et al.

(10) Patent No.: US 9,995,194 B2
(45) Date of Patent: Jun. 12, 2018

(54) SYSTEM FOR PREVENTING THE UREA CRYSTAL FORMATION WITHIN AN EXHAUST GAS AFTER TREATMENT SYSTEM

(71) Applicant: FPT MOTORENFORSCHUNG AG, Arbon (CH)

(72) Inventors: Daniel Assalve, Appenzell Steinegg (CH); John Campbell, St. Gallen (CH); Harald Fessler, Arbon (CH); Reto Schlegel, Thal (CH)

(73) Assignee: FPT Motorenforschung AG, Arbon (CH)

( * ) Notice: Subject to any disclaimer, the term of this patent is extended or adjusted under 35 U.S.C. 154(b) by 203 days.

(21) Appl. No.: 14/905,363

(22) PCT Filed: Jul. 18, 2014

(86) PCT No.: PCT/EP2014/065504
§ 371 (c)(1),
(2) Date: Jan. 15, 2016

(87) PCT Pub. No.: WO2015/007885
PCT Pub. Date: Jan. 22, 2015

(65) Prior Publication Data
US 2016/0153334 A1    Jun. 2, 2016

(30) Foreign Application Priority Data
Jul. 18, 2013 (EP) .................................... 13177048

(51) Int. Cl.
*F23R 3/40* (2006.01)
*F01N 3/20* (2006.01)

(52) U.S. Cl.
CPC ........... *F01N 3/208* (2013.01); *F01N 3/2066* (2013.01); *F01N 2610/02* (2013.01);
(Continued)

(58) Field of Classification Search
CPC ................................... G01N 1/00; F23R 3/40
See application file for complete search history.

(56) References Cited

U.S. PATENT DOCUMENTS 5,972,299 A * 10/1999 Huang .................... F01N 1/089
422/173
6,361,754 B1 * 3/2002 Peter-Hoblyn ......... B01D 53/90
422/169

FOREIGN PATENT DOCUMENTS

DE    102005011657    9/2006
DE    102007052262    5/2009
(Continued)

OTHER PUBLICATIONS

International Search Report and Written Opinion for International Application No. PCT/EP2014/065504; dated Dec. 10, 2014; 10 pages.

*Primary Examiner* — Jyoti Nagpaul
(74) *Attorney, Agent, or Firm* — Stetina Brunda Garred and Brucker

(57) ABSTRACT

System for preventing the urea crystal formation within the ATS, the exhaust ATS comprising a dosing module having dosage means for producing a spray of urea-based reducing agent defining a spray cone downstream of the dosage means, the device comprising an electric heating element, suitable to be connected to an electrical energy source, arranged in order to operatively fall within the spray cone.

13 Claims, 4 Drawing Sheets

(52) U.S. Cl.
CPC .... *F01N 2610/10* (2013.01); *F01N 2610/102* (2013.01); *F01N 2610/1453* (2013.01); *Y02A 50/2325* (2018.01); *Y02T 10/24* (2013.01)

(56) References Cited

FOREIGN PATENT DOCUMENTS

| | | |
|---|---|---|
| DE | 102010025880 | 1/2012 |
| DE | 102010041094 | 3/2012 |
| WO | WO2006014129 | 2/2006 |

* cited by examiner

SYSTEM FOR PREVENTING THE UREA CRYSTAL FORMATION WITHIN AN EXHAUST GAS AFTER TREATMENT SYSTEM

CROSS-REFERENCE TO RELATED APPLICATIONS

The present application claims priority to PCT International Application No. PCT/EP2014/065504 filed on Jul. 18, 2014, which application claims priority to European Patent Application No. 13177048.9 filed Jul. 18, 2013, the entirety of the disclosures of which are expressly incorporated herein by reference.

STATEMENT RE: FEDERALLY SPONSORED RESEARCH/DEVELOPMENT

Not Applicable

FIELD OF THE INVENTION

The present invention relates to the fields of the After Treatment Systems, and in particular to the field of systems for preventing the urea crystal formation within the ATS.

DESCRIPTION OF THE PRIOR ART

Aftertreatment systems are commonly used to reduce emissions. The NOx reduction is mainly realized by a selective catalytic reduction (SCR) system. The required Ammonia (NH3) for the reduction of the NOx is usual injected as a liquid with dissolved UREA, commonly AdBlue® or DEF (Diesel Exhaust Fluid) with water with 32.5% of urea.

The evaporation of the liquid (water) and the decomposition (thermolysis and hydrolysis) of the urea requires some energy. This energy is usually delivered by the hot exhaust gas. However at lower exhaust gas temperature and velocity there is often insufficient energy exchange from the gas to avoid liquid wall wetting and formation of solid deposits. This is an unacceptable behavior due to wrong NH3 dosing to the SCR system and/or increased back pressure due to deposits.

On one side methods are known that inhibit the urea-based reducing agent injection when the SCR (Selective catalytic Reduction) have a temperature lower that 300° C.

One the other side it is known the use of heaters arranged around the engine exhaust pipe in order to heat the exhaust gasses.

SUMMARY OF THE INVENTION

Therefore it is the main object of the present invention to provide a system for preventing the urea crystal formation within the exhaust system.

The main principle of the invention is: to directly heat the urea mixture after its spraying, namely after its injection.

The basic idea of the present invention is to insert, within the exhaust system at least one heating element within the cone formed by the urea mixture spray, in order to directly heat the urea mixture.

The present invention finds implementation in any kind of dosing module for dosing a reducing agent.

A preferred implementation of the present invention can be carried out in the dosing module disclosed in the patent EP 2339137 of the same applicant.

Therefore, another object of the present invention is a dosing module for dosing a urea-based reducing agent into a gas exhaust stream generated by a combustion engine and addressed to an after-treatment system, the dosing module comprising: a portion of an exhaust pipe which develops along an axis; dosage means for dosing said urea-based reducing agent as a spray defining one or more spray cones, and an electric heating element, suitable to be connected to an electrical energy source, arranged within said portion of exhaust manifold in order to operatively fall within said spray cone.

Several tests have been carried out at 300° C. of exhaust gas temperature. No deposits has been found at this critical load point if the heating element have a temperature of at least ~350° C., thus a temperature that is a few tens of degrees higher than the gas temperature.

The main advantage of the present invention is that the electric power required for avoiding the crystal formation is several times less than those systems that aim to heat the exhaust gasses and, only indirectly, the urea mixture.

These and further objects are achieved by means of an apparatus and method as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing FIGS., wherein.

The same reference numerals and letters in the figures designate the same or functionally equivalent parts.

DETAILED DESCRIPTION OF THE PREFERRED EMBODIMENTS

Figure 1:
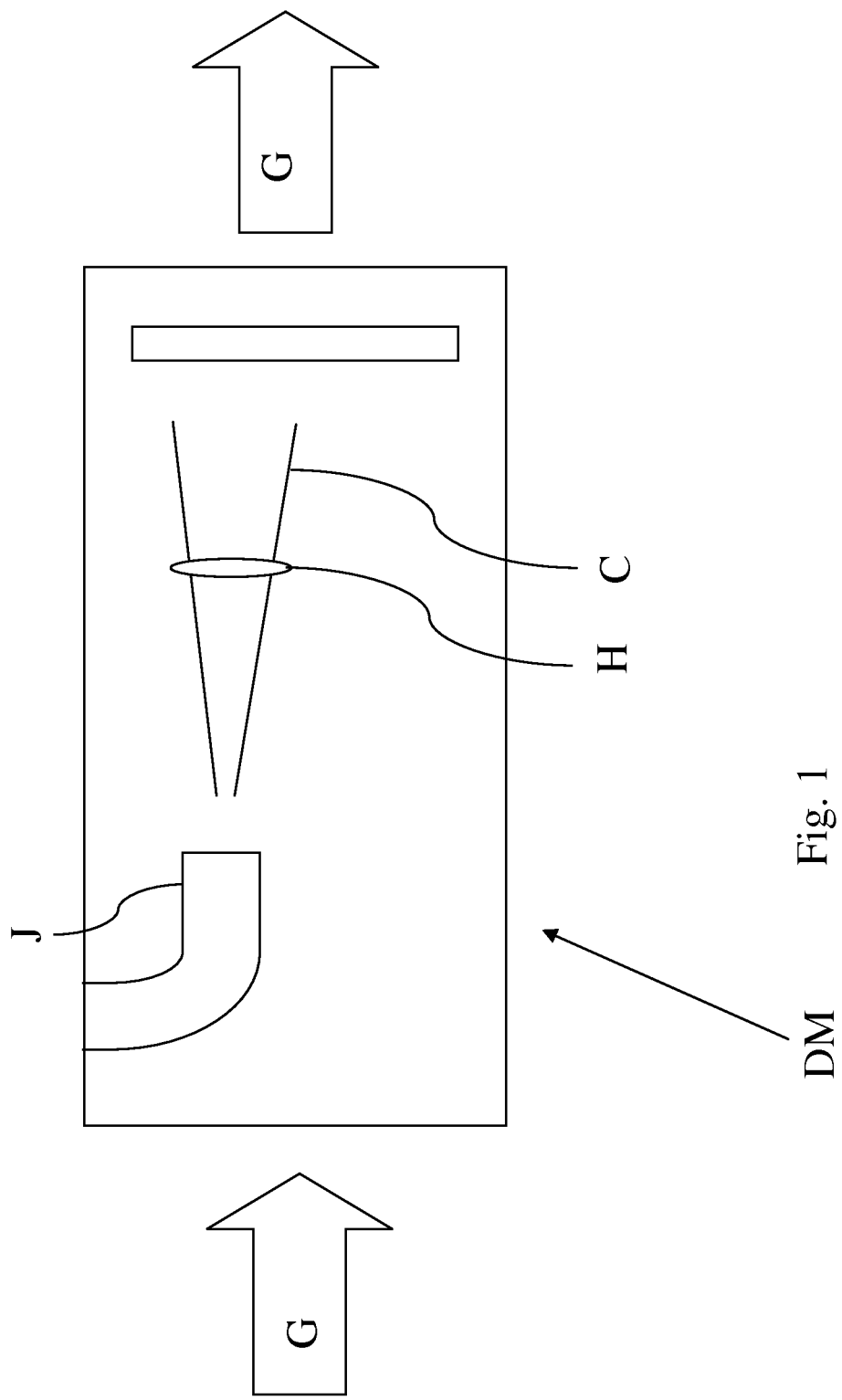
FIG. 1 shows a side view of a schematic example of implementation of the system of the present invention.

On FIG. 1 is shown a dosing module DM, and in particular a side view of a portion of an exhaust pipe defining the ATS.

An injector J—also called dosing means—produce a spray of urea mixture, forming at least one spray cone C.

According to the present invention an electric heating element H—or simply "heater"—is arranged in a portion P of said pipe, downstream of the dosing module DM, with respect to the exhaust gas flow indicated by the thick arrow on the left of the sheet of FIG. 1, so as to be crossed by the spray cone C.

This means that the heating element does not have a continuous surface, facing the injector nozzle, but has a through hollow body, comprising one or more paths, that can be easily crossed either by the urea spray, and/or by the exhaust gas G.

Optionally, a mixer M can be present downstream of the heater H.

The electrical heating element is suitable to be connected to an electrical source, for example, through the vehicular electrical circuit.

It should be understood that any kind of electric source can be used.

According to a preferred embodiment of the invention, the heater is not directly electrically coupled with the energy source, but the circulating current within the resistance wire(s) is induced by means of magnetic fields. Therefore, an inducing coil can me arranged outside the exhaust pipe, directly supplied by the vehicular electric circuit, and an inducted coil can be arranged inside the ATS, directly connected with the heater(s) for supplying thereof.

In this way, the electrical wires connected to the vehicular circuit are not stressed by the high temperatures reached within the ATS.

In the following, for "pipe" is intended a portion of the exhaust system, upstream of the SCR device. Furthermore, for "urea mixture" is intended "urea-based reducing agent".

The heater H has the aim to transfer as much heating as possible to the urea mixture. Therefore, it is preferable not to blend excessively the exhaust gas/urea mixture at the heating element. This reflects on the shape of the heating element itself.

It is intended that the heating element has suitable supporting means BK to be arranged within the exhaust pipe.

For example, the heating element can be pre-arranged in a short portion of the pipe P suitable to be connected downstream of the dosing module DM.

As alternative, the heating element is arranged within the dosing module DM by forming a single vehicular component.

Anyway, the heater is in direct contact with the urea-mixture spray.

According to a preferred embodiment of the present invention (not shown), the heating element has a cylindrical shape, having the developing axis coincident with the axis of the spray cone C. In particular one or more resistance wires are wrapped up by defining themselves the cylindrical surfaces.

According to a second preferred embodiment, such cylindrical shape is conical with its vertex V that can be oriented towards the injector nozzle or in the opposite direction. In other words, when the vertex V are directed according the respective spray directions, the bases B of the conical shape are oriented towards the nozzles.

Figure 2:
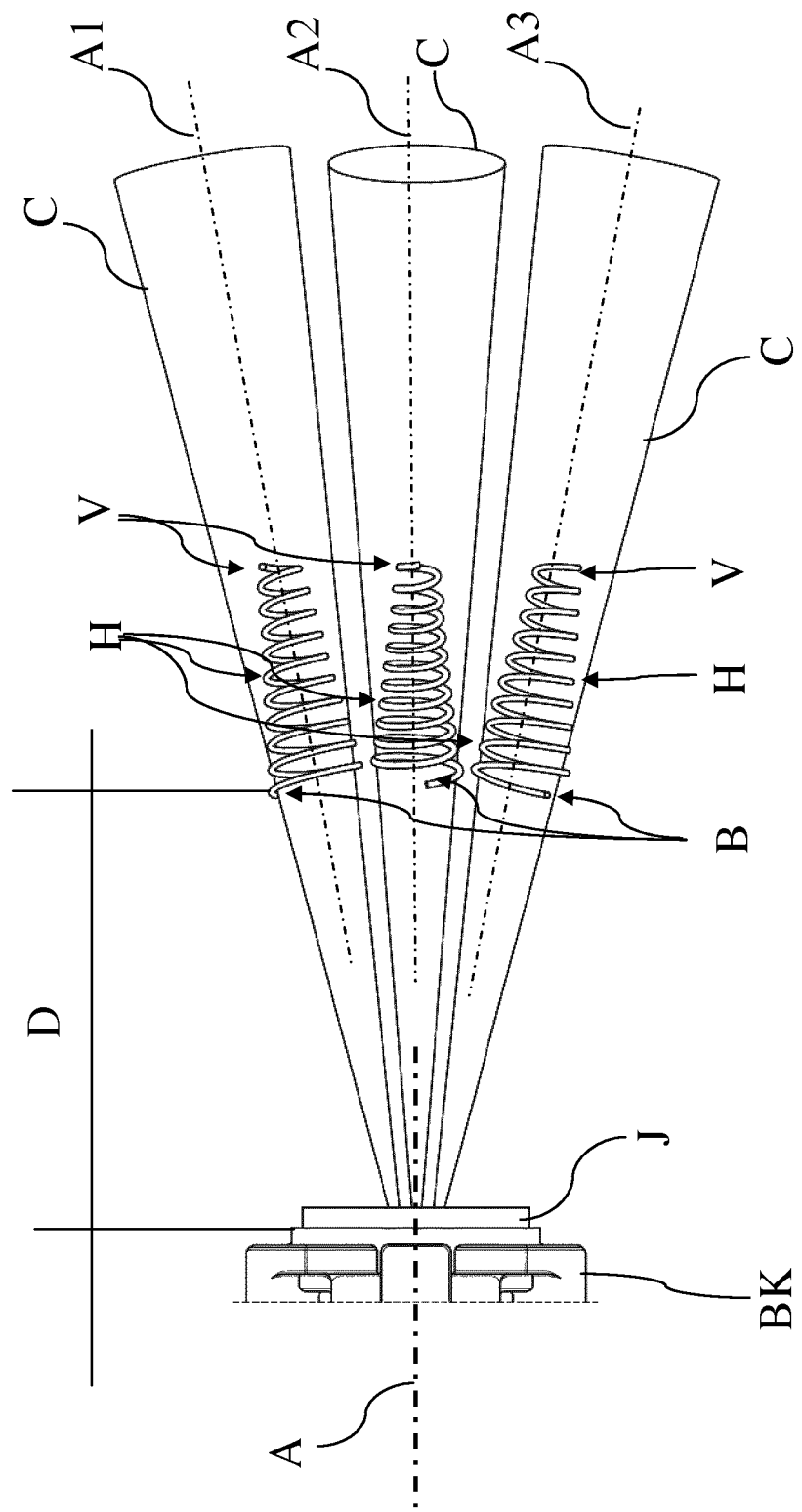
FIG. 2 shows schematically a side view of an implementation of the system of FIG. 1 to a coaxial dosing module.
Figure 3:
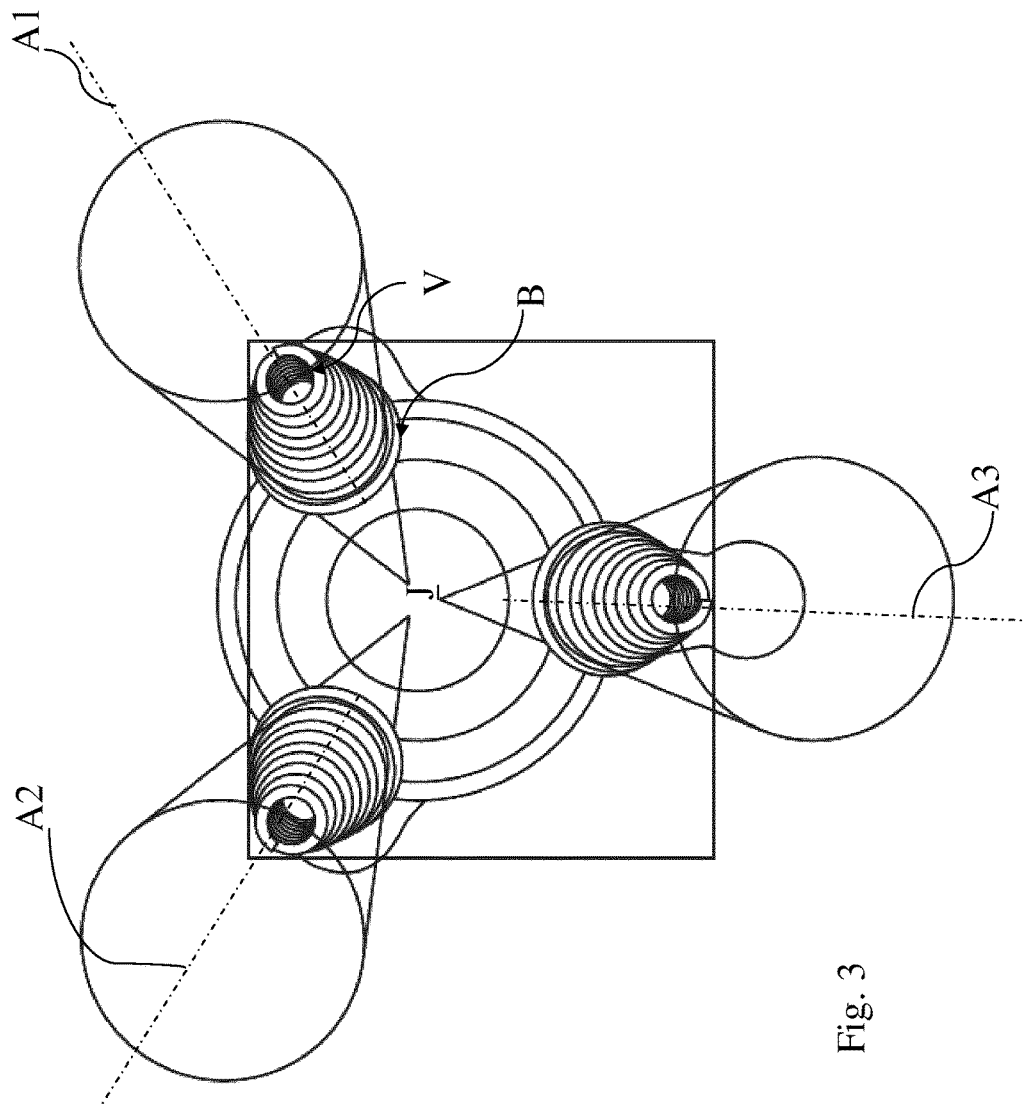
FIG. 3 shows an axial view, according to an opposite direction with respect to the gas flow, of the heating system according to FIG. 2.

According to several tests, it has been appreciated a better heat exchange between the heating element and the urea mixture, when the bases B of the wound conical heating elements H is oriented towards the respective nozzles, namely the vertexes C are according to the injecting direction, see for example FIGS. 2 and 3.

Figure 4:
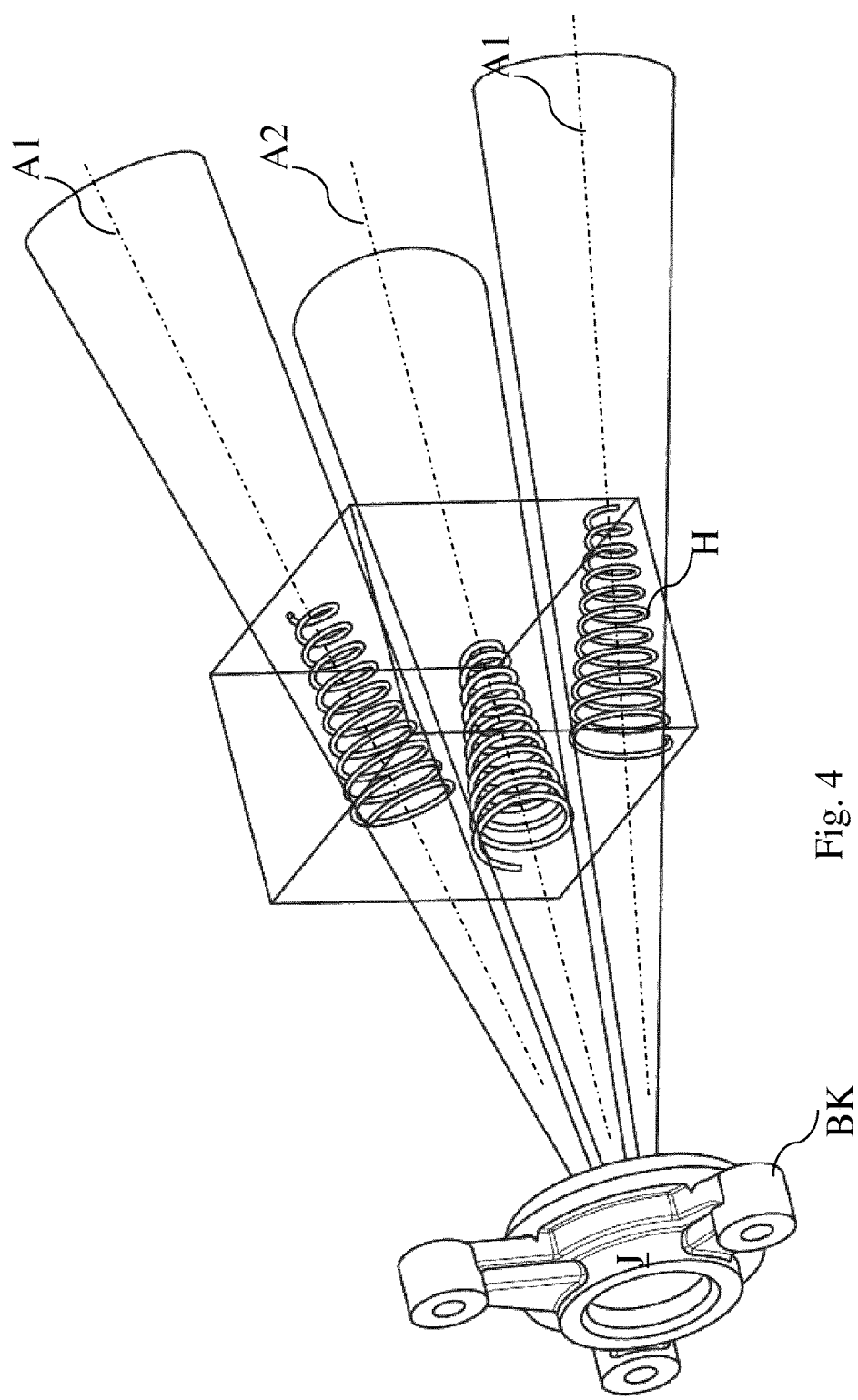
FIG. 4 shows a perspective view of the system as shown in FIGS. 2 and 3.

FIGS. 2, 3 and 4 show a preferred implementation of the present invention, to a coaxial dosing module, namely a dosing module having the injector J in the centre line A of the exhaust pipe as, for example, disclosed in the patent EP2339137, wherein the injector has three nozzles generating three corresponding spray cones.

It should be noted that the cubes represented on FIGS. 3 and 4 serve only to better show the heaters orientation in the space.

The features of the dosing module disclosed on claim 1 of EP2339137(B1) are herewith incorporated by reference.

The brackets BK are also shown for fixing the injector inside the exhaust pipe P.

According to the same FIGS. 2-4, the heating elements H are conical spirals of resistance wire, having their development axis coincident with the respective axis A1, A2, A3 of the spray cones.

The spray cones can be equally angularly spaced between each another and slightly diverging with respect to the centre line A, that defines an axis of axial symmetry for the dosing module DM and the portion of exhaust pipe hollowing the dosing module.

It is preferred that the cones are reciprocally slightly diverging, in order to avoid the overlapping of the cones in an early stage of the spray, namely close to the injector.

It is preferred to arrange the heating elements H where the spray cones are sufficiently open, for example, at a distance D from the nozzle of the injector ranged between 80% and 120% of the pipe inner diameter. For example, if the pipe has a diameter of 100 mm, the heaters are distanced from the injector between 80 mm and 120 mm. Such distance D is measured on the center line axis A considering an axial projection of the bases B (vertexes V) on the center line axis A, when the bases B (vertexes V) are oriented towards the nozzle. A preferred distance D is about 89 mm with a pipe diameter of 101 mm.

This gives the possibility to better and easily arrange the heater inside the exhaust pipe P.

The heating element is preferably made of resistance wire having a circular transversal section of about 1-3 mm of diameter—or simply thick—, preferably 1.5 mm, and have about 8-20 spirals with a pitch comprised between 2 and 6 mm.

According to a preferred embodiment, the heating elements have about 10 spirals with a pitch of 4 mm, thus the longitudinal development of each heating element is about 40 mm. Wire length, diameter and material has to be selected in combination with the voltage of the electric source in order to reach a temperature of at least 50-60° C. higher than a predetermined critical load point of the exhaust gas, that usually is between 260-310° C.

According to another embodiment of the present invention, each heater, can be formed by two or more object one enclosed in another. For example two or more cylinders of increasing dimensions each enclosed in another as a matrioska.

Many changes, modifications, variations and other uses and applications of the subject invention will become apparent to those skilled in the art after considering the specification and the accompanying drawings which disclose preferred embodiments thereof.

Any combination of the features of the several embodiments explicitly disclosed forms part of the present disclosure.

Further implementation details will not be described, as the man skilled in the art is able to carry out the invention starting from the teaching of the above description.

The invention claimed is:

1. Dosing module (DM) for dosing a urea-based reducing agent into a gas exhaust stream generated by a combustion engine and addressed to an after-treatment system (ATS), said dosing module (DM) comprising:
    a portion of an exhaust pipe (P) which develops along an axis (A);
    dosage means (J) for dosing said urea-based reducing agent as a spray forming one or more spray cones (C), and
    an electric heating element (H), suitable to be connected to an electrical energy source, arranged in order to operatively fall within said spray cone (C), wherein said spray cone (C) defines a development axis (A1, A2, A3) and said heating element (H) comprises one or more resistance wires wrapped up for defining a cone having its own developing axis coincident with the axis (A1, A2, A3) of the spray cone (C).

2. Dosing module according to claim 1, wherein said electric heating element (H) has a portion of pipe (P) suitable to be mounted downstream of said dosing module (DM) and supporting means (BK) for arranging said electric heating element (H) within said portion of pipe (P) for operatively falling within said spray cone (C).

3. Dosing module according to claim 1, wherein said heating element (H) has a through hollow body that can be crossed either by the urea mixture spray, and/or by engine exhaust gasses (G).

4. Dosing module according to claim 1, wherein a vertex (V) of said cone is oriented towards the dosing means (J).

5. Dosing module according to claim 1, wherein the heating element (H) is made of 1-3 mm thick of resistance wire and has about 8-20 spirals with a pitch comprised between 2 and 6 mm.

6. Dosing module according to claim 1, wherein the heating element (H) is directly connected to an electric source.

7. Dosing module according to claim 1, wherein a distance (D) between said dosage means (J) and said heating element is about between 80% and 120% of the inner pipe portion (P) diameter.

8. Dosing module according to claim 1, wherein said dosage means (J) produce three or more spray cones (C) slightly diverging between each other and equally angularly spaced between each other and wherein said dosing module comprises as many heating element (H), one for each spray cone.

9. Vehicle comprising an internal combustion engine and an ATS for treating the exhaust gas of the internal combustion engine, wherein the ATS comprises the dosing module according to claim 1.

10. Dosing module according to claim 1, wherein a vertex (V) of said cone is oriented away from the dosing means (J).

11. Dosing module according to claim 1, wherein the heating element (H) is made of 1.5 mm thick of resistance wire and has 10 spirals with a pitch of 4 mm.

12. Dosing module according to claim 1, further comprising a first coil directly connected with the heating element (H) and disposed inside said portion of pipe (P) and a second coil, arranged externally of said portion of pipe (P), directly connected to an electric source, and magnetically coupled with said first coil.

13. Method for preventing the urea crystal formation within an ATS, the exhaust ATS comprising a dosing module (DM) having dosage means (J) for producing a spray of urea-based reducing agent forming a spray cone (C) downstream of said dosage means (J), the method comprising the step of heating said spray of urea-based reducing agent my means of at least one heater (H) crossed by spray itself, wherein said spray cone defines a development axis (A1, A2, A3) and said at least one heater (H) comprises one or more resistance wires wrapped up for defining a cone having its own developing axis coincident with the axis (A1, A2, A3) of the spray cone (C).

* * * * *